US006813438B1

(12) United States Patent
Bates et al.

(10) Patent No.: US 6,813,438 B1
(45) Date of Patent: Nov. 2, 2004

(54) METHOD TO CUSTOMIZE THE PLAYBACK OF COMPACT AND DIGITAL VERSATILE DISKS

(75) Inventors: Cary Lee Bates, Rochester, MN (US); Chih-Hsiang Chou, Cupertino, CA (US); Jeffrey Michael Ryan, Byron, MN (US); John Mathew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 896 days.

(21) Appl. No.: 09/656,103

(22) Filed: Sep. 6, 2000

(51) Int. Cl.[7] .............................. H04N 5/85; H04N 5/93
(52) U.S. Cl. ......................................... 386/125; 386/52
(58) Field of Search ................................ 386/125, 126, 386/124, 105, 106, 45, 40, 52, 55, 64, 82, 4, 1; 360/13; 345/723; H04N 5/85, 5/93

(56) References Cited

U.S. PATENT DOCUMENTS

| | | | |
|---|---|---|---|
| 5,675,769 A | * 10/1997 | Ruff et al. ................... 711/173 |
| 5,734,787 A | * 3/1998 | Yonemitsu et al. .......... 386/111 |
| 5,737,476 A | 4/1998 | Kim ............................. 386/52 |
| 5,929,857 A | 7/1999 | Dinallo et al. ............... 345/354 |
| 5,959,684 A | 9/1999 | Tan et al. .................... 348/515 |
| 5,974,008 A | 10/1999 | Lee ............................. 369/33 |
| 5,990,884 A | 11/1999 | Douma et al. ............... 345/327 |
| 5,991,244 A | 11/1999 | Kondo et al. ................. 369/33 |
| 6,011,592 A | 1/2000 | Vaughan et al. ............. 348/552 |
| 6,011,760 A | 1/2000 | Fleming, III ................. 369/32 |

* cited by examiner

Primary Examiner—Robert Chevalier
(74) Attorney, Agent, or Firm—Karuna Ojanen

(57) ABSTRACT

A playback program for DVDs and CDs enables a user to customize the playback of the disk. Regions that are independent of prerecorded tracks are created and/or played back based on the content of the disk, e.g., visual content or audio content, in those regions. Thus, for instance, certain scenes or certain dialogue of the disk can be skipped over during playback because an attribute to skip or otherwise modify the output was assigned to a particular region during creation of the program. Several start-up modes can be programmed during creation of the program to indicate whether the disk will initially skip to the first region whose output is modified or playback normally until a region with an modified output is encountered. A password may be required to access the playback program.

21 Claims, 11 Drawing Sheets

"METHOD TO CUSTOMIZE THE PLAYBACK OF COMPACT AND DIGITAL VERSATILE DISKS"

TECHNICAL FIELD

This invention relates generally to the field of compact disks (CDs) and digital versatile disks (DVDs), and more specifically, relates to generating a program to edit data on the disks for customizing viewing and/or listening based on content.

BACKGROUND OF THE INVENTION

Compact disks (CDs) and digital versatile disks (DVDs) are information storage devices used for storing audio, video, and/or other multimedia information in digital format which may include movies, music, literary works such as books, encyclopedias, computer software, etc. The same laser technology is used to store and playback the digital information in both CDs and DVDs. Briefly, both DVDs and CDs store information as a pattern of pits formed in a metallic substrate. The pit patterns form digital words and can be read by shining a laser beam on the disk surface and detecting the reflected beam. The reflected beam is detected by an optoelectronic receiver which decodes the beam and converts the beam to the corresponding audio or video output. DVD players have many of the same features as CD player, such as the ability to play selections in any order desired and the ability to read information from any point on the disk.

The information storage capacity of a DVD is much higher than a CD; presently available DVDs have a variety of capacities and may be up to seventeen gigabytes depending upon the technology used to manufacture the disks. This high information storage capacity makes DVDs suitable for storing not only audio information but also video information and large amounts of computer data. DVDs, moreover, can store information in different formats.

An industry standard for coding audio-visual information in a digital compressed format on the disks was developed and is continually being updated by the Moving Picture Experts Group and carries the name MPEG. In addition, a DVD may also store uncompressed linear pulse code modulated data streams which have sample rates between 48–90 kilohertz and are sampled at 16 or 24 bits. Still other CD and/or DVD versions can store digital data, which may or may not be compressed, for computer use.

There are existing disk players and computer programs which allow a user to program specific songs or movies from a disk to play or exclude. One such method is set forth in U.S. Pat. No. 6,011,760 entitled "Method for Skipping and/or Playing Tracks on a CD or a DVD." These methods, however, rely on preexisting formatting of tracks, e.g., on a CD one track exists for each song rather than on the actual information content.

There is thus a need in the industry for a method to allow a user to program the playback of a disk based on the information content of the material without regard to preexisting formatting. The industry is lacking a technique to allow a user to skip certain scenes in a DVD movie, or skip the dialog but retain the visual images in certain scenes or edit the playback of certain lyrics of musical performances. The industry, moreover, not only fails to provide such a mechanism; it does not allow programming of the playback based on the information content to be accomplished in real time.

SUMMARY OF THE INVENTION

These needs and others that will become apparent to one skilled in the art are satisfied by a method to create a playback program for a disk, comprising the steps of: selecting a region of the disk based on content, the region being independent of tracks defined during the recording of the content onto the disk; ascribing at least one playback attribute to the selected region; and saving the region and the at least one ascribed playback attribute in a semiconductor memory. The method may further comprise selecting another region and ascribing another playback attribute to that other region.

The step of selecting the region may determine a starting boundary and a stopping boundary of each of the regions. The method of the invention may further comprise modifying the output of the content in the regions between the boundaries according to the playback attribute during playback of the disk. The method may also allocate a start-up mode to indicate whether to playback the disk or to skip to the first region at the beginning of the playback program.

The content may be a stream of video data wherein the start-up mode causes the playback program to advance to the first region and modify the video output in accordance with the playback attribute of the region. Alternatively, the start-up mode may cause the playback program to play from the beginning of the disk and modify the video output in the regions in accordance with the playback attribute of the region.

The content may be a stream of audio data wherein the start-up mode causes the playback program to advance to the first region and modify the audio output in accordance with the playback attribute of the region. Alternatively, the start-up mode may cause the playback program to play from the beginning of the disk and modify the audio output in the regions in accordance with the playback attribute of the regions.

The method further includes modifying the output of the content of the regions between the stopping boundary of one region and the starting boundary of another region according to the playback attribute during playback of the disk.

A password may be assigned to access the playback program.

The invention may be also understood as a method to create a playback program for a disk, comprising the steps of: selecting a plurality of regions of the disk based on content, the regions being independent of tracks defined during the recording of the content onto the disk; determining a starting boundary and a stopping boundary of each of the regions; ascribing one or more playback attributes to each of the selected regions; saving the regions and the ascribed playback attributes for each region in a semiconductor memory; modifying the output of the content of the regions between the starting boundary and the stopping boundary according to the playback attribute during playback of the disk; assigning a password to access the playback program; allocating a first start-up mode to advance to the first region; allocating a second start-up mode to playback the disk from the beginning of the disk; allocating a third start-up mode requiring the password to access the playback program. In the first start-up mode, the playback program advances to the first region and modifies the output of the disk in the regions in accordance with the playback attribute of the region. In the second start-up mode, the playback program plays from the beginning of the disk and modifies the output of the disk in the regions in accordance with the playback attribute of the regions. In the third start-up mode, the disk is played back unmodified from the beginning if the password is verified. The method may further comprise detecting when a scene change occurs in video output of the disk and marking the scene change as a boundary of the region.

The invention is also an apparatus to create a playback program to modify the output of a disk, comprising: a microprocessor; a semiconductor memory connected to the microprocessor; a disk identifier to read the disk and assign an identify to the playback program corresponding to the disk; a content reader to read the content of the disk; a region creator to create regions independent of any manufactured tracks of the disk based on the content of the region; an attribute assigner to assign an attribute to modify the output of the content of the disk in each region; and a pointer to point to the next region, if any. The apparatus of the invention may further comprise a password requester requiring a password before the playback program can be accessed. The apparatus may be a personal computer, or a microprocessor-based disk player.

The invention may further be considered a program product for use with a disk player connected to a microprocessor and a semiconductor memory for creating and/or executing a playback program, the program product comprising a signal-bearing medium carrying thereon: a program assigner to provide an identification to the playback program corresponding to a particular disk; a region creator to create regions based on the content of the region independent of any manufactured tracks of the disk; an attribute assigner to assign an attribute to modify the output of the content of the disk in each region; and a pointer to point to the next region, if any.

Yet, the invention may also be considered an apparatus to create a playback program to modify the output of a disk, comprising: a means to view and/or listen to the content of the disk; a means to create/read regions corresponding to the content of the disk independent of prerecorded tracks on the disk; and a means to assign a modification attribute to modify the output of the disk in the regions.

BRIEF DESCRIPTION OF THE DRAWING

The novel features believed characteristic of the invention are set forth in the claims. The invention itself, however, as well as a preferred mode of use, objects and advantages thereof, will best be understood by reference to the following detailed description of an illustrative embodiment when read in conjunction with the accompanying Drawing, wherein:

DETAILED DESCRIPTION OF THE INVENTION

Figure 1:
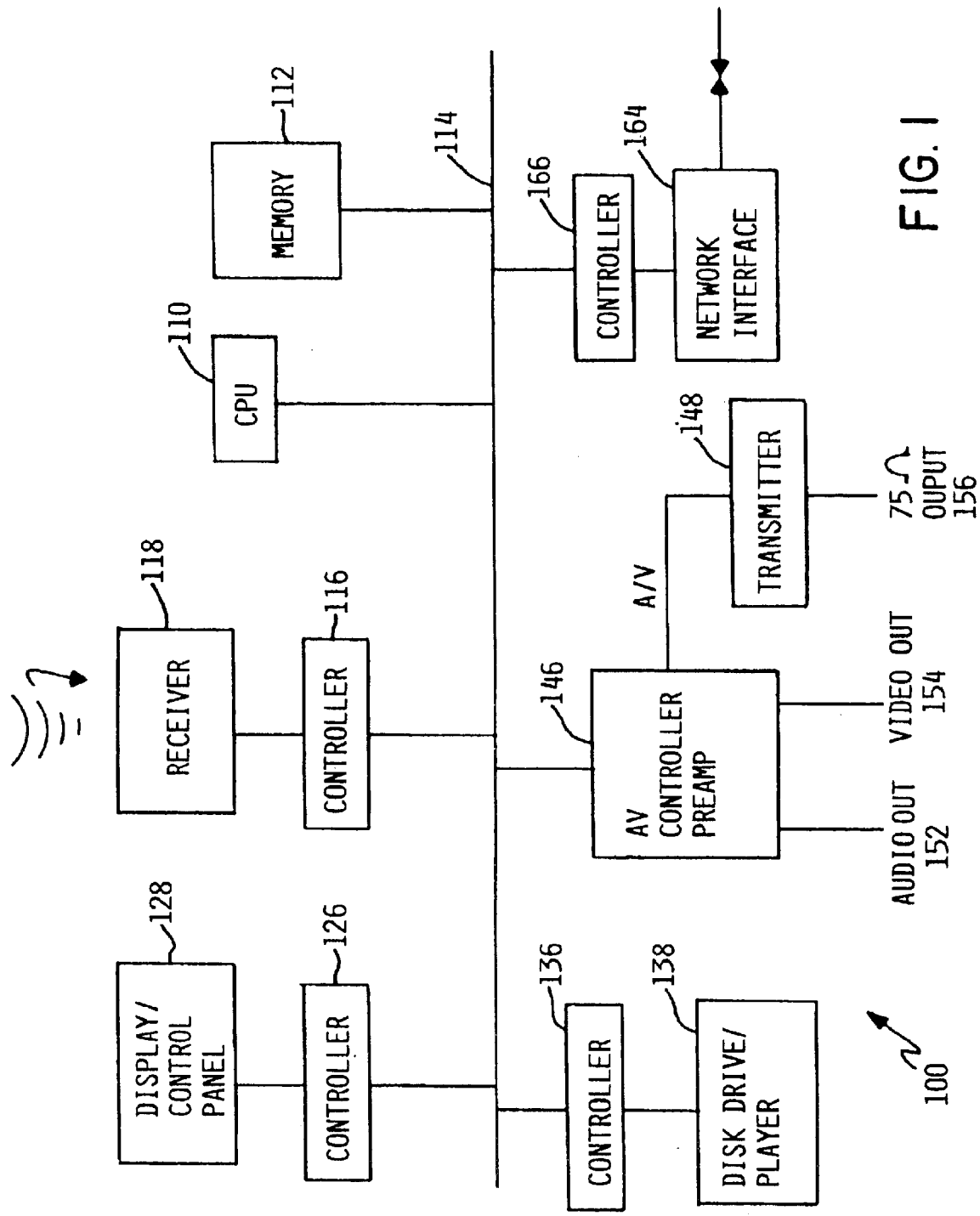
FIG. 1 is a simplified block diagram of a disk system capable of generating and implementing a program to customize playback of a disk in accordance with principles of the invention.

Referring to the Drawing, wherein like numbers denote like parts throughout the several views, FIG. 1 shows a high-level block diagram of a Program Playback Controller 100 capable of implementing a preferred embodiment of the invention. Program Playback Controller system 100 comprises a central processing unit (CPU) 110 and a nonvolatile memory 112 connected to each other and to a number of electronic device controllers 116, 126, 136, 146, and 166 across an internal communications bus 114. CPU 110 may be a general-purpose programmable microprocessor or an ASIC, either of which are capable of executing instructions stored in memory 112. CPU is suitably programmed to carry out the preferred embodiment of the method to program the playback of disks, as described in more detail in the flowcharts of the figures. Alternatively, the function of figures could be implemented by control circuitry through the use of logic gate, programmable logic devices, or other hardware components in lieu of a processor-based system. Memory 112 is a semiconductor memory for storing data and programs; memory is shown conceptually as a single monolithic entity, it being understood that memory may be arranged in a hierarchy of caches and/or a plurality of memory devices. Internal communications bus 114 supports the transfer of data, commands and other information between the different controllers, memory 112 and CPU 110; while shown in simplified form as a single bus, it is may be structured as multiple buses which may be arranged in a hierarchical form. Controller 116 may be connected across the internal communications bus 114 to memory 112 and the CPU 110 and to an infrared (IR) receiver for receiving infrared waves from outside the Program Playback Controller 100 such as with a remote control device for purposes of accessing DVDs or CDs, laser disks, or other optical disks, hereinafter referred to as disks; it being understood that other forms of electronic input devices, such as a keyboard, pointing device, mouse, etc. could be used. Controller 126 may be connected to a display control panel 128 which displays the status of the Program Playback Controller 100. Controller 136 is connected to a standard DVD player, CD drive, or other optomechanical device 138 capable of reading data stored on a disk. An audio/video controller and preamplifier 146 connected across the internal communications bus 114 receives the audio and video signals from the disk player 138 and then prepares and drives combined audio/video signals to a transmitter 148 for output on, for instance, a 75 Ω cable connected to a television, a cathode ray tube (CRT) device, a flat panel display, or other electronic device capable of displaying the output of the disk. The audio/video controller 146 also provides separate outputs for audio signals 152 and video signals 154 to other external devices. The Program Playback Controller system 100 may also have a network controller 166 and network interface 164 to provide a physical interface to the Internet or other communications network for the transfer of digital data. The network interface 164 may comprise a modem connected to a telephone line to connect to an Internet access provider or on-line service provider, but increasingly other higher bandwidth interfaces are implemented and so is intended to include cable services, TTL lines, Ethernet, ISDN, Token Ring, etc. The Program Playback Controller system 100 shown in FIG. 1 is intended to be a simplified representation, many variations in system configuration are possible in addition to those specifically mentioned here.

As will be described in detail below, aspects of the preferred embodiment pertain to specific method steps implementable on Program Playback Controller system having a CPU 110. In an alternative embodiment, the invention may be implemented as a computer program-product for use with the Program Playback Controller system 100. The programs defining the functions of the preferred embodiment can be delivered to the system 100 via a variety of signal-bearing media, which include, but are not limited to: (a) information permanently stored on non-writable storage media, e.g., read only memory devices within either computer such as CD-ROM, DVD or other optical disks readable by an optical disk drive 138; (b) alterable information stored on writeable storage media, e.g., floppy disks within diskette drive or hard-disk drive connected to the CPU 110 and memory 112 (not shown); or (c) information conveyed to a computer by a telephone or a cable media network, including wireless communications through network interface 164. Such signal-bearing media, when carrying computer-readable instructions that direct the functions of the present invention, represent alternative embodiments of the present invention.

In accordance with principles of the invention, as will be understood, a user can create programs to modify the playback of a disk based on the actual informational content and store those programs in memory 112. Through interaction with the display/control panel 128 either by touch, voice, keyboard or mouse input, or through the infrared receiver 118, a user can create programs to be stored in memory and then recall those programs for watching or listening to a particular disk in accordance with the program. Using the invention, a person can customize the playback of the disks to remove undesirable audio or visual content such as profane language, violence, sex; or a person may skip to desirable audio or visual content, such as profane language, violence, sex. Using the program, a user may either skip or advance to specified content such as certain musical performances like a particular aria or a particular choreography, or advance to specific written content.

Figure 2A:
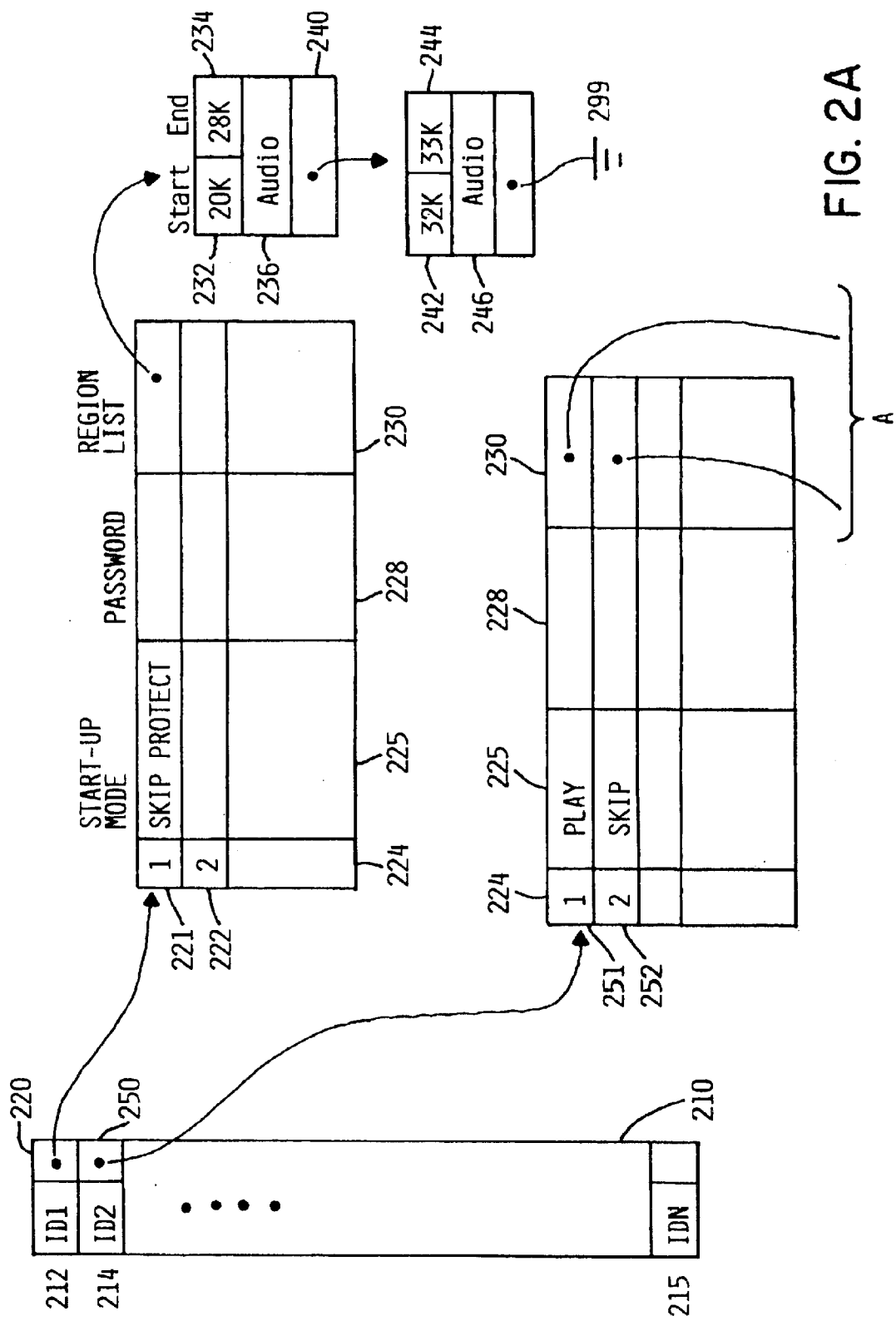
FIG. 2 is diagram of an example of data structures that can be stored in a program pertaining to a digital data stream. It is suggested that FIG. 2 be printed on the face of the patent.
Figure 2B:
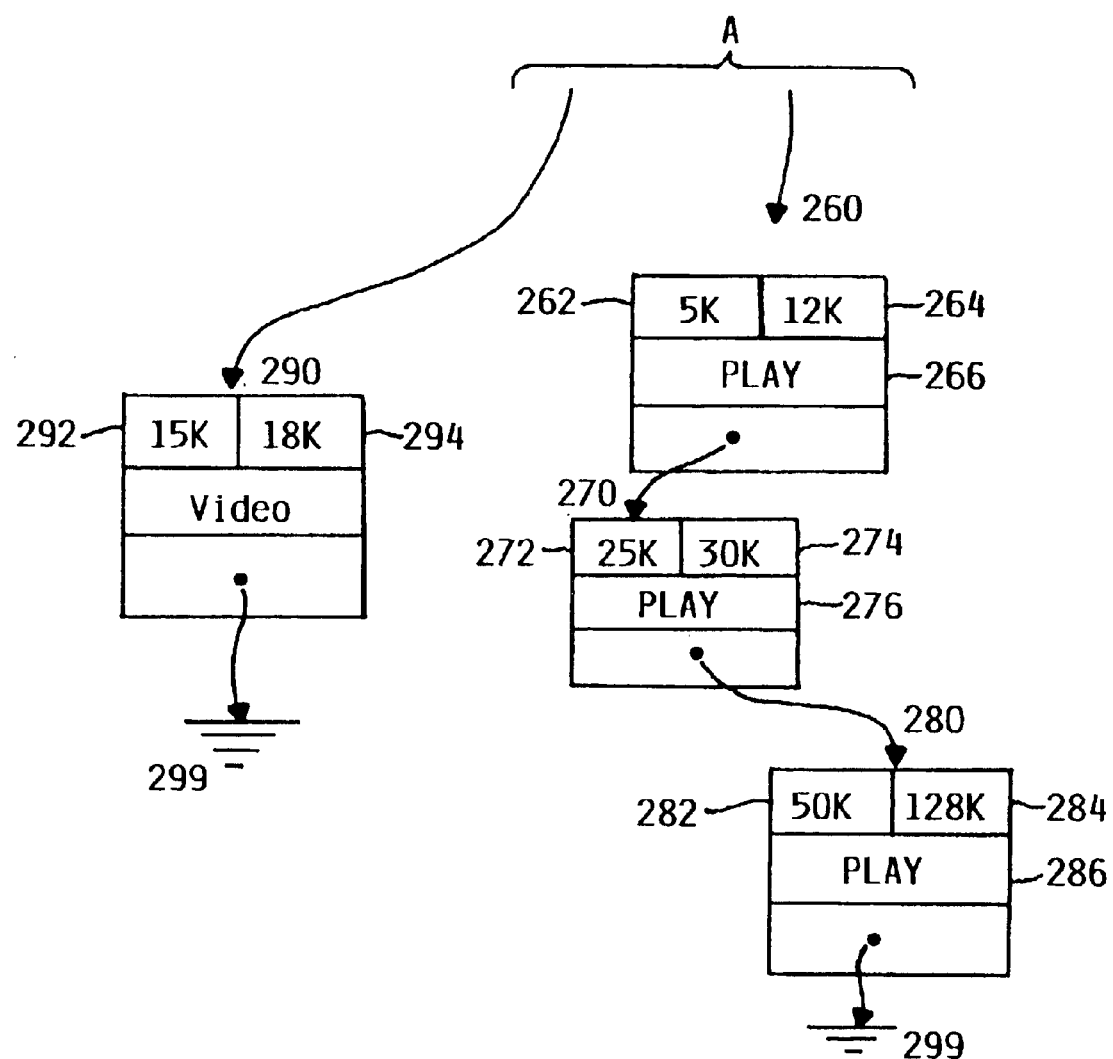

FIG. 2 illustrates a proposed data structure to be stored in memory 112 in accordance with an embodiment of the invention. A disk catalog 210 has a number of entries 212, 214 . . . 215, each corresponding to a disk having at least one playback program. The identification fields 218 may store data derived from the disk in accordance with manufacturing and industry standards which identifies the disk. For instance, ID1 could identify a DVD movie, such as The Matrix and ID2 could identify a musical CD, such as the opera Aida by Verdi. Associated with each entry in the disk catalog 210 is a playback program list, two of which are shown as 220, 250. A playback program list, e.g., 220, identifies existing playback programs 221, 222 of disk 212. Playback program list 250 provides a number of programs 251, 252 for the disk identified by ID2. These playback programs, 221, 222, 251, 252, may have been created by the user in accordance with an embodiment of the invention, or in another embodiment of the invention, could be prepackaged on the disk or otherwise available, such as from the Internet or by purchase, etc. Each program 221, 222, 251, 252 has a number of fields 224, 226, 228 and 230.

Field 224 identifies a particular program and may provide a commentary or other means to recognize and distinguish the program. Start-up mode field 225 indicates the action performed at the beginning of the disk, i.e., whether to begin playing the disk normally or to skip until the first region identified in the region list 230. If the start-up mode 225 is PLAY then the disk is advanced to the first region identified in region list 230 and only those regions are played back; if the start-up mode 225 is SKIP the disk begins to play at the beginning but when the playback advances to a region specified in the region list 230, the playback is modified in some fashion which may mean to skip over or ignore certain kinds of data in the regions. A SKIP PROTECT in the start-up mode 225 requires a password to retrieve and playback the disk in an unmodified fashion. If a password is not entered, the output from the regions identified by the region list 230 are skipped or otherwise modified. Accordingly, the password field 228 may provide a password for a particular program.

The region list field 230 has further information, such as the boundaries, i.e., the starting address 232 and the stopping address 234, of the region in which the data output is modified in accordance with the attribute 236, e.g., audio, video, skip, play, etc. The boundaries in the illustration represented in kilobytes are not intended to be limitative; depending upon the format of the disk, whether the data is compressed, the boundaries may be represented in, for instance hundred of kilobytes or megabytes or even gigabytes. By way of example, if the start-up mode 225 is SKIP and the attribute in field 236 is AUDIO, then when playing back the disk, the disk will ignore or not playback the audio portion of the data stream in the region having the starting address 232 up to the stopping address 234. There may be pointer 240 to another region setting forth the boundaries, i.e., a starting address 242 and a stopping address 244, in which the data is modified according to a different attribute identified by the attribute field 246. In this instance, the pointer field 240 has a region having starting address 244 and further indicating that the audio portion of the data stream will be skipped. Thus, in this fashion, attribute field 236, 246, 2*6, may be used to override or to supplement the actions set forth in the start-up mode 225 of the main playback program. In one embodiment, the attribute field 2*6 is used to separate the video portion of the data stream from the audio portion, as in the examples above, or it may be programmed as a filter for particular channels or frequencies so that during the interval defined by the starting and stopping addresses, for instance, certain sound frequencies such as bass or treble or soprano, etc. or certain color frequencies or certain words can be skipped or enhanced. For instance, in program 252 between starting address 15K 292 to stopping address 18K 294, the video data stream as indicated by field 296 is skipped meaning that the video output data in that region is nil. Pointer field 240 can point to another region, e.g., 260, 270, 280 or may end 299.

Figure 3A:
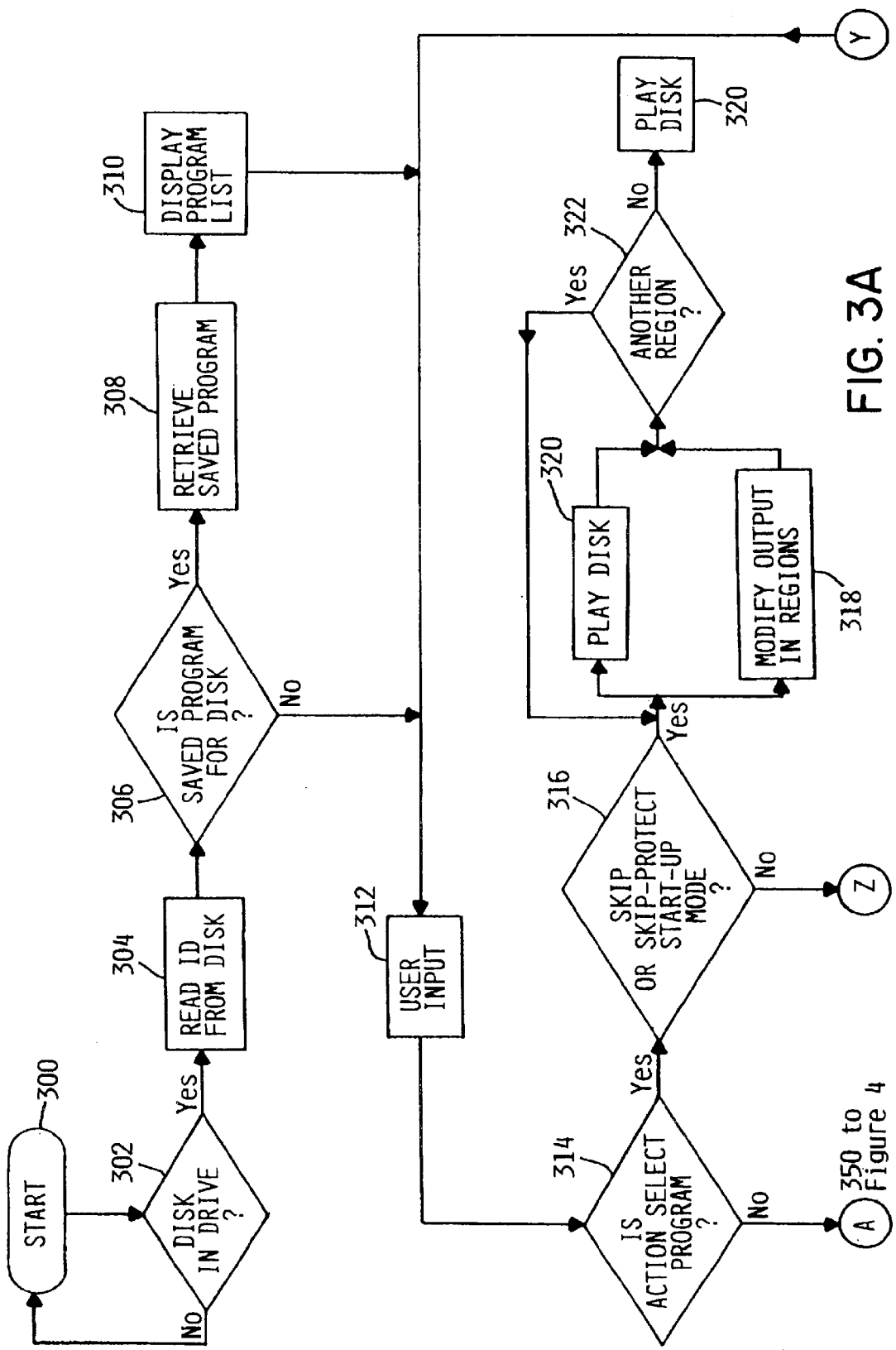
FIGS. 3 through 6 are simplified flow charts of a process by which to generate a program to customize the playback of a disk in accordance with principles of the invention.
Figure 3B:
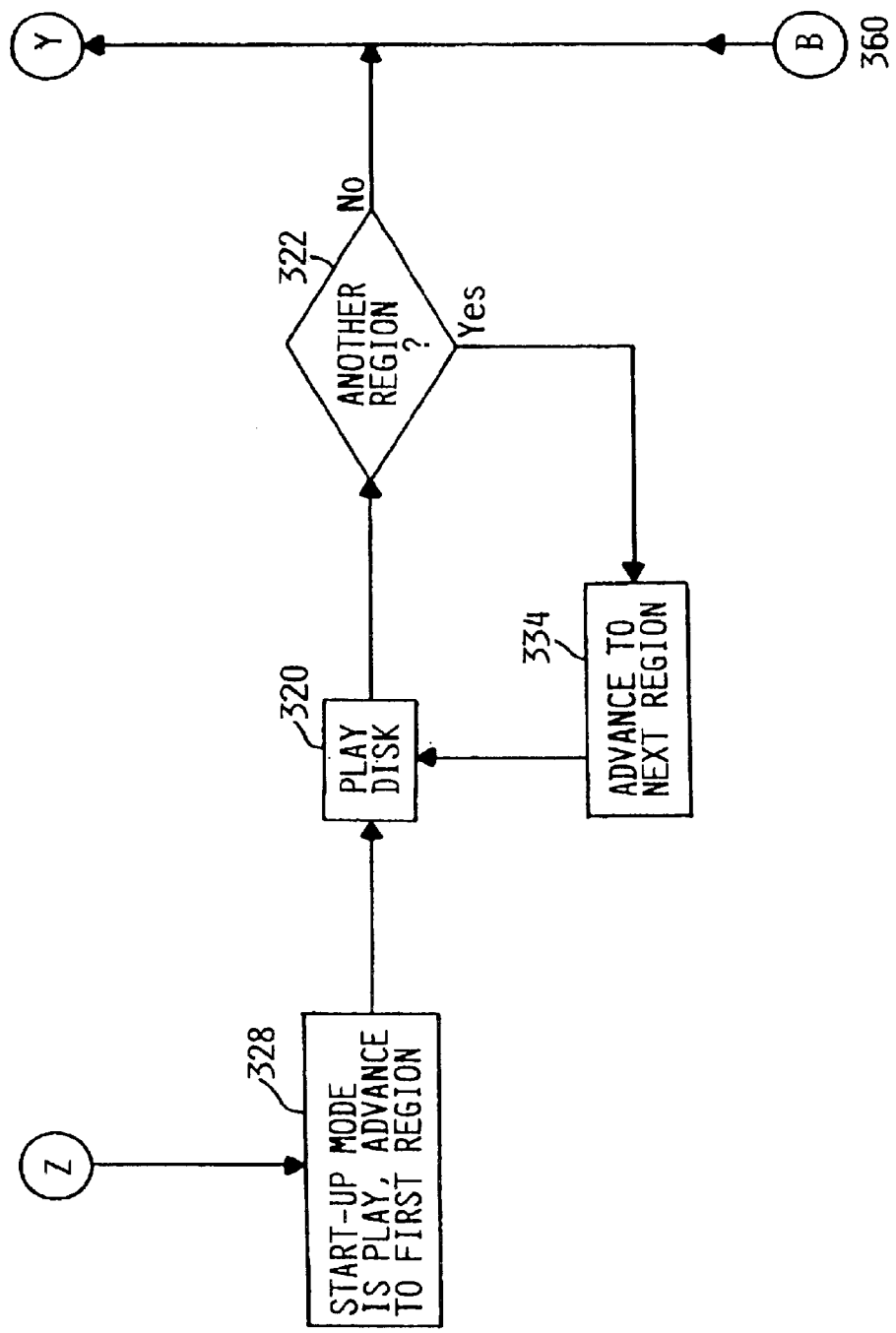

FIG. 3 is a flow chart of the process by which to create and playback programs in accordance with the preferred embodiment of the invention. The process starts at step 300 and at step 302 inquires whether there is a disk present in the disk player 138. If there is a disk present then the process reads the identification information recorded on the disk in step 304. Step 306 interrogates memory 112 to determine if a playback program, such as 220 in FIG. 2, has been previously saved in the disk catalog 210 for this ID. If so, then the saved program list 220 for the identified disk is retrieved from memory 112 in step 308 and displayed to the user in step 310. The display may be on a television, a computer display, through speakers, printed on a printer, a LCD or LED display, or other interface as discussed earlier.

In any event, user input is required now at step 312 in which the user must provide input to the Playback Program Controller system and choose, for instance, at step 314 one of the displayed programs if there are more than one saved program for this disk. Again, user input may be through a remote controller with an IR transmitter, a keyboard, a mouse, or other pointer device, a microphone, a touch panel, etc. If the user's response is to select a program in step 314, then the start-up mode 225 of that program is read at step 316 to determine if the start-up mode-is SKIP or SKIP PROTECT. If so, the disk begins to play from the beginning as in step 320 until it advances to a region having a starting address as in fields 230 and 232 and then in parallel at step 318 the output data are modified as indicated by the attribute field 2*6 until the stopping address 234 is reached during the playback. There may be a pointer to another region as in field 240 so step 322 inquires if there is another region. If so, the program loops back to play the disk as in step 320 and concurrently modifies the output in that region as in step 318. If there is no other region, the disk is played as in step 320 until the end of the disk.

In FIG. 3, however, if the start-up mode 225 is not SKIP or SKIP PROTECT in the decision block of step 316, then, by default, the start-up mode is PLAY and the disk is forwarded to the first region of the program as in step 328 and the program will playback the region as in step 320. At step 322, the program inquires if there is another region to play, and if so then at step 334, the program advances the disk to the next region and plays the next section list 230 until there are no more regions to be played as in step 332 and user input is then required at step 312 again.

Figure 4A:
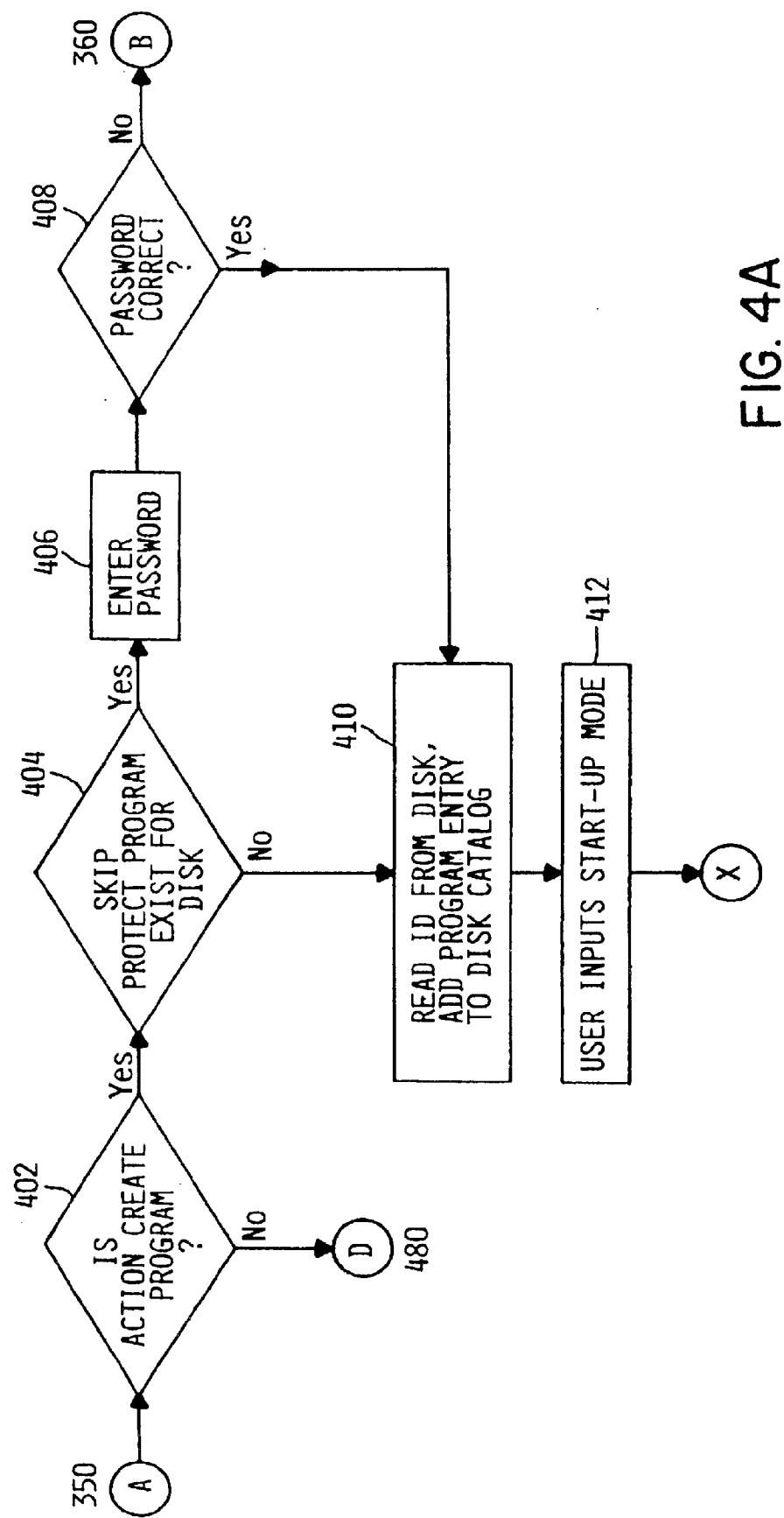
Figure 4B:
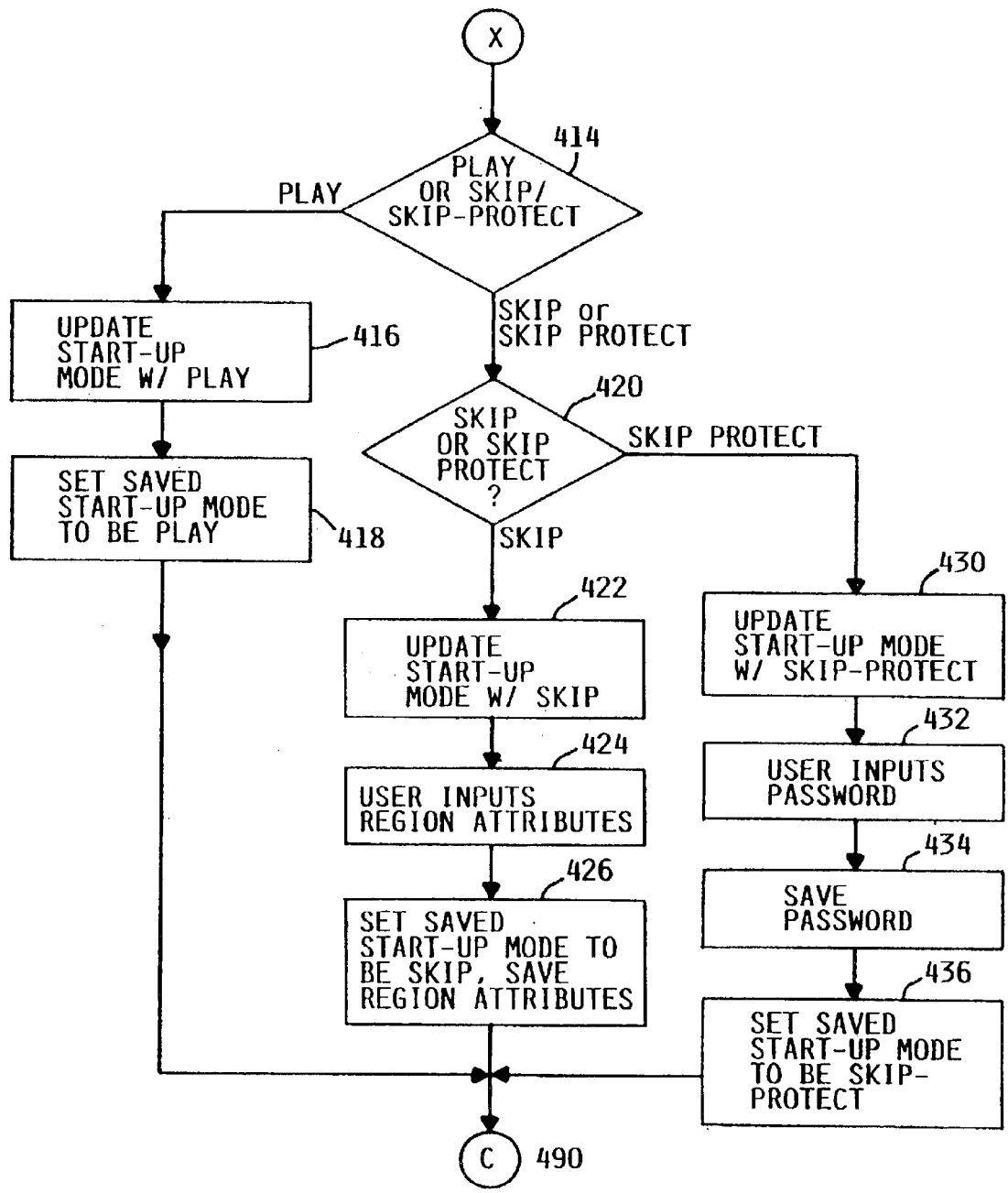

If, as in step 314, the user does not select a program, then the process branches to A and the steps illustrated in the simplified flow diagram of FIG. 4 at step 350. From step 350, an inquiry at step 402 determines if the user action is to create a program. If the user does not wish to create a program, the process branches to D at step 480 to be discussed with respect to FIG. 6.

If, however, the user wishes to create a program, the process branches to step 404 to determine if a SKIP PROTECT program exists for the disk having that identification. If no SKIP PROTECT program exists for the identified disk, then at step 410 a new program entry is added to the program list 220 and, if necessary, a new entry in the disk catalog 210 set forth in FIG. 2. At steps 412 and 414 the user is required to select the start-up mode to be PLAY, SKIP, or SKIP PROTECT. If the user selects the attribute as PLAY, the disk start-up mode 225 is updated with the PLAY attribute in step 416 and saved in step 418. If, however, the user choose SKIP or SKIP PROTECT as the default attribute, the process branches at step 420 depending upon the choice. If the chosen attribute is SKIP, then at step 422, the start-up mode in the data structure is updated with the SKIP attribute and user input is requested at step 424 to determine what sensory output, i.e., audio or video, what channel or frequencies, etc. should be skipped. At step 426, the start-up mode SKIP and the attributes are saved in the program. At step 420, if the chosen attribute is SKIP PROTECT, the start-up mode entry is updated with SKIP PROTECT as in step 430. The attribute of PROTECT requires a password so, at step 432, a password is requested from the user and saved in the password field 228 of the program entry in the main data structure in step 434. Then at step 436, the start-up mode is saved as SKIP PROTECT. In any event, whenever a start-up mode is changed and/or saved, the process proceeds to C at step 490.

Figure 5:
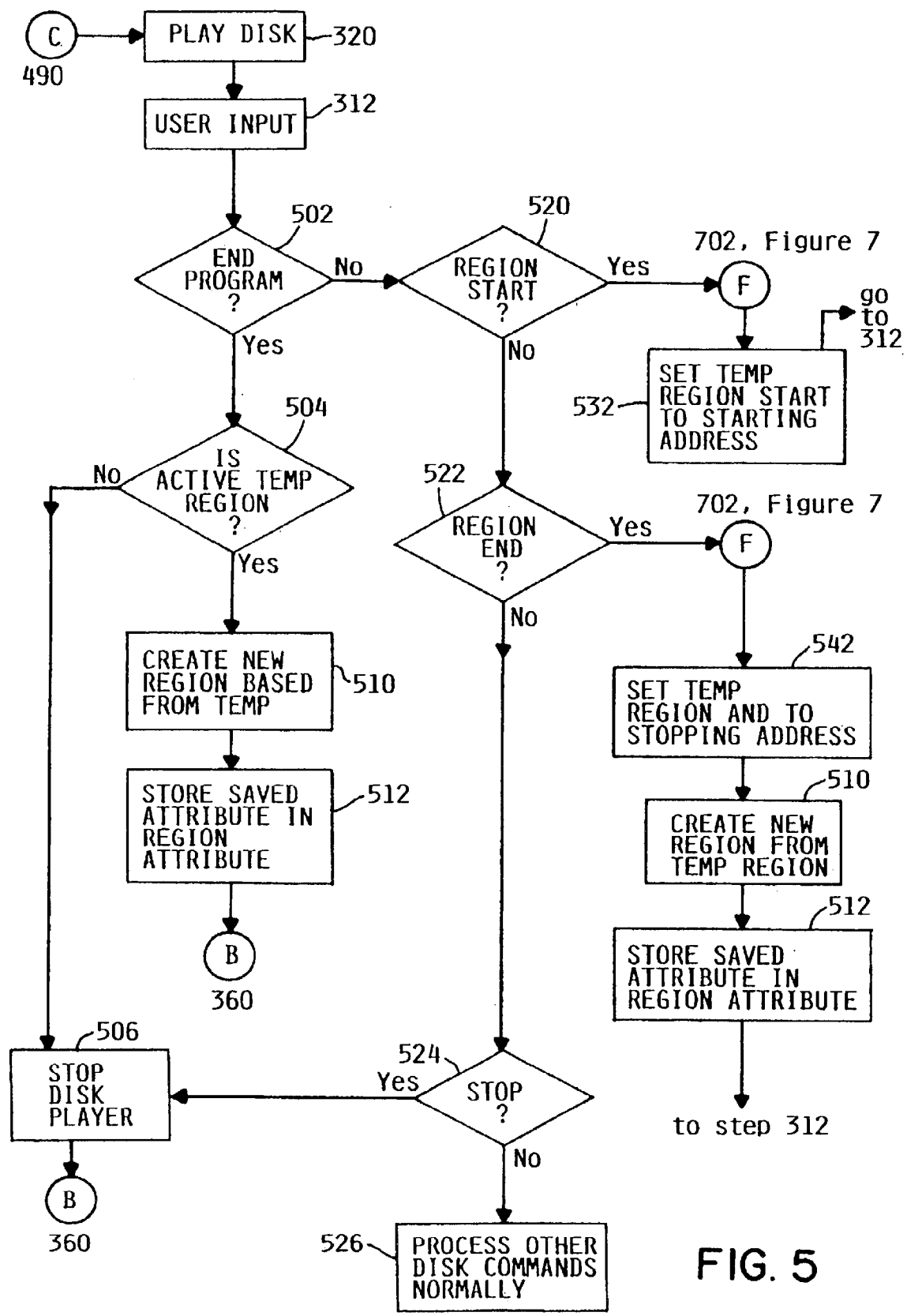

At C in step 490 the process continues as illustrated by the simplified block diagram of FIG. 5. The disk is played as in step 320 and user input is requested as in step 312. If the disk is not at the end of a program, as in the decision block of step 502, there is then an inquiry if the user wishes to create a region by determining a starting address, as in step 520. At this time, the process will branch to an embodiment to determine the starting address of a region based on the content of the region; in the preferred embodiment, the process branches to step 702, F, of FIG. 7. Once the boundary determination process is complete the temporary region will be saved as the starting address of the region in step 532. If the user does not wish to establish the start of a region at step 520 but rather wishes to determine the end of a region, as in step 522, by for instance activating a Region End indicator, the program will undergo its method to determine the boundaries of the region and, in accordance with one embodiment as in FIG. 7 involving a video data stream, may backup the disk for a scene change in order to record that frame where the scene changes as a stopping boundary, i.e., a stopping address of the temporary region as in step 542. A new region listing as in data field 230 is created in the program from the boundaries of the temporary region in step 544 and the attribute saved from steps 424 and 426 are saved to that region. The program then loops to step 312 requesting user input to establish the next region, if any.

Returning to the other option of block 522, if the End Region button is not pressed and if the Stop button is not pressed, as in step 524, then another disk command is processed in the a normal process as in step 526. If the Stop button is pressed, as in step 524, the disk player is stopped and user input is again requested, as in step 312.

If the disk is at the end of a program, as in the decision block of step 502, there may be an active temporary region as in step 504. If there is no active temporary region, the disk player is stopped as in step 506 and the program loops to step 312 on FIG. 3 requesting user input. If however, there is an active temporary region, then a new region in the region list 230 of FIG. 2 is created as in step 510. The attribute saved from the flow chart of FIG. 4 at step 424 is saved as the attribute within this region, as set forth in step 512. The program loops to step 312 on FIG. 3 requesting user input.

Figure 6:
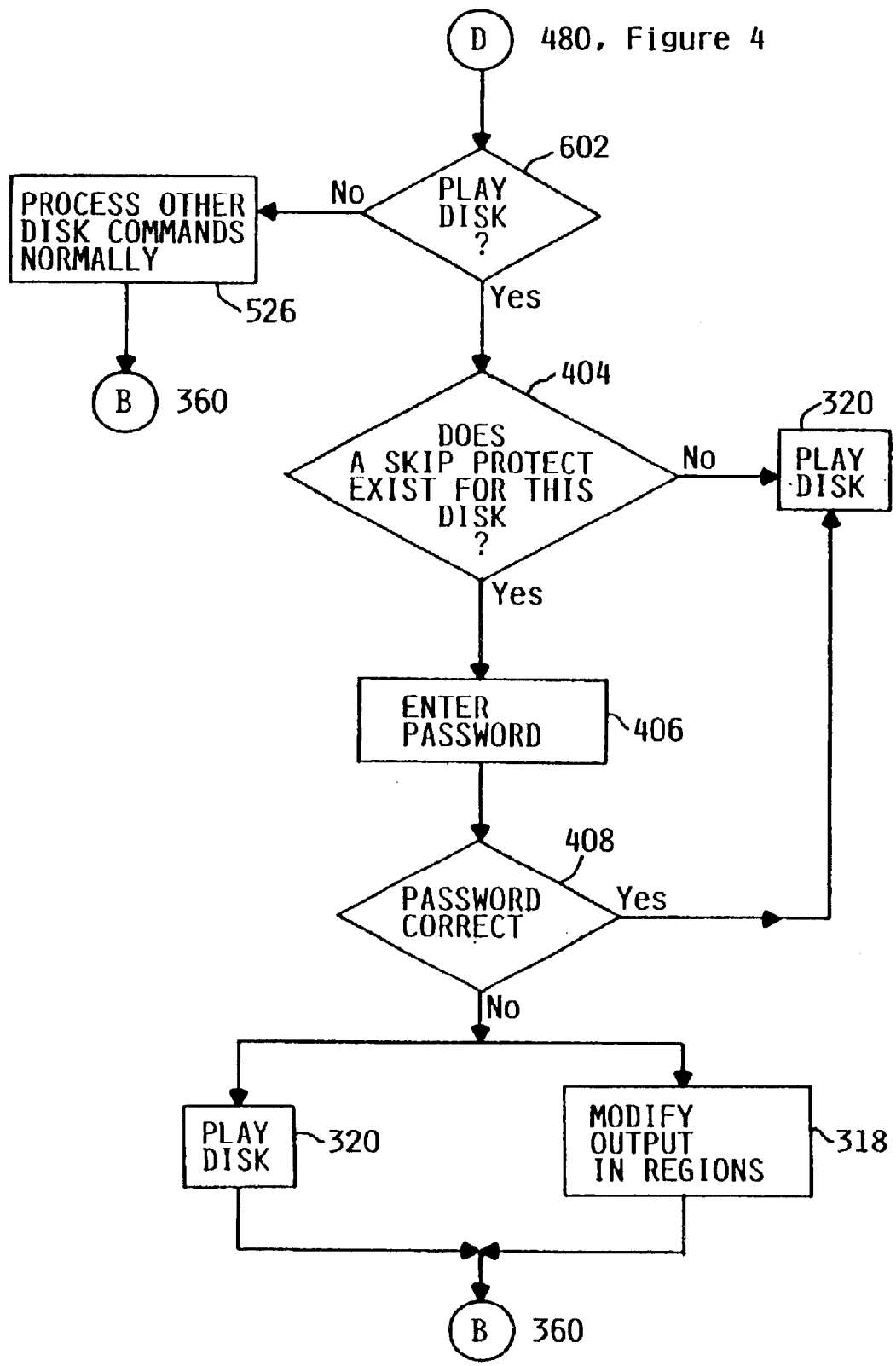

FIG. 6 picks up the program from FIG. 4 at D when the user declined at step 402 to create a program. The decision block 602 checks if the user requests to PLAY a disk. If the user wishes to playback a disk then the process inquires at step 404 if a SKIP PROTECT program exists for the disk having the identification of the disk in the disk player. If the program selected has the attribute SKIP PROTECT, then the password is input by the user at step 406 and verified at step 408. If the password is correct at step 408 or if the program is not a SKIP PROTECT program for the identified disk at step 404, then the disk is played as in step 320. If, however, the password is not correct as in step 408 then the disk begins to play as in step 320 but, in parallel, the output of the disk is modified as indicated by the attribute field 226 in the regions specified in boundary fields, as in step 318. When playback of the disk is completed, user input is then requested in block 312 of FIG. 3. If the command is not to playback a disk, other commands are processed in accordance with block 526 and the process again loops back at B 360 to require user input at step 312.

Figure 7:
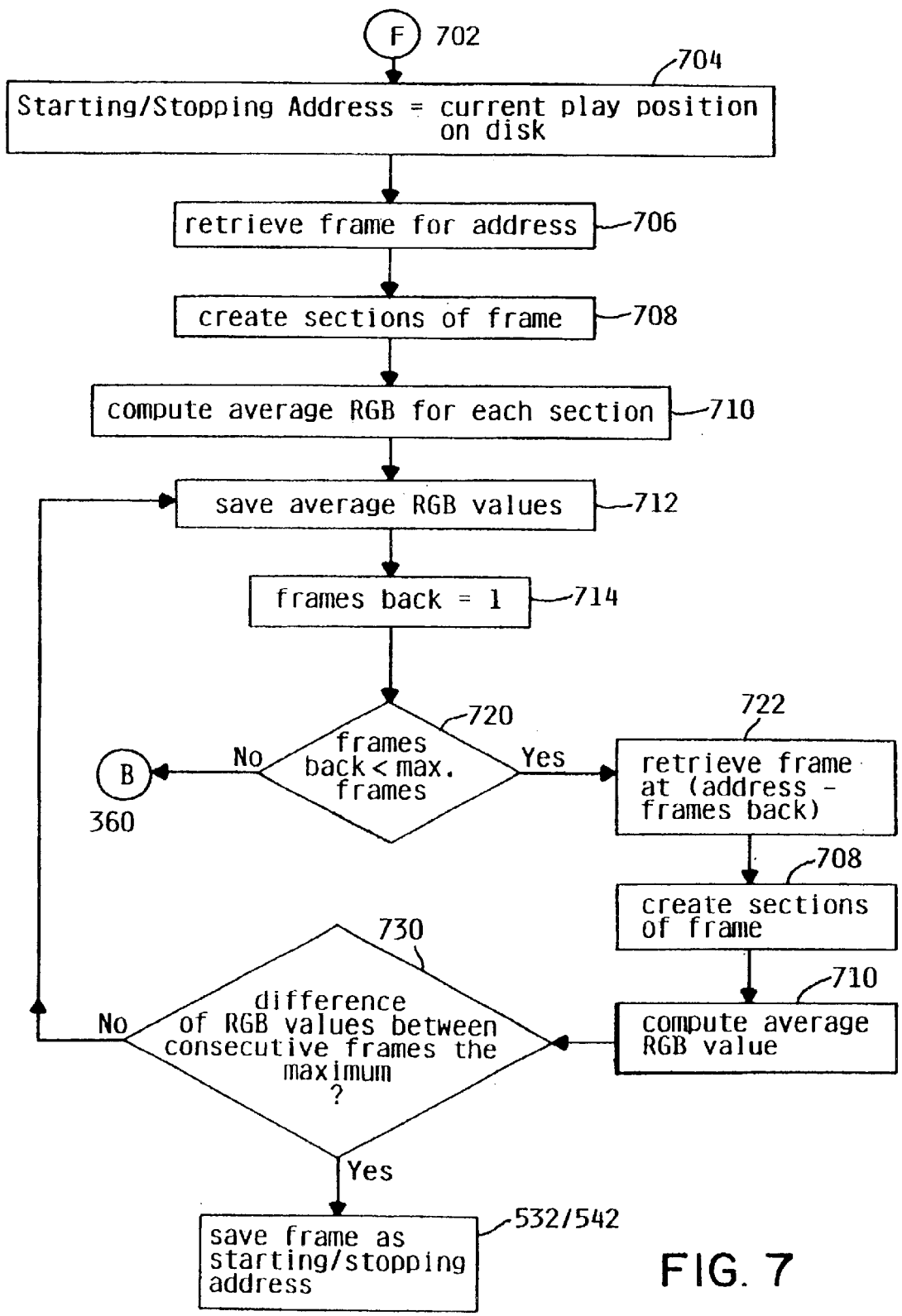
FIG. 7 is a simplified flow chart of a method to select boundaries based on visual content of regions of the disks in which the playback of the content may be modified.
Figure 8:
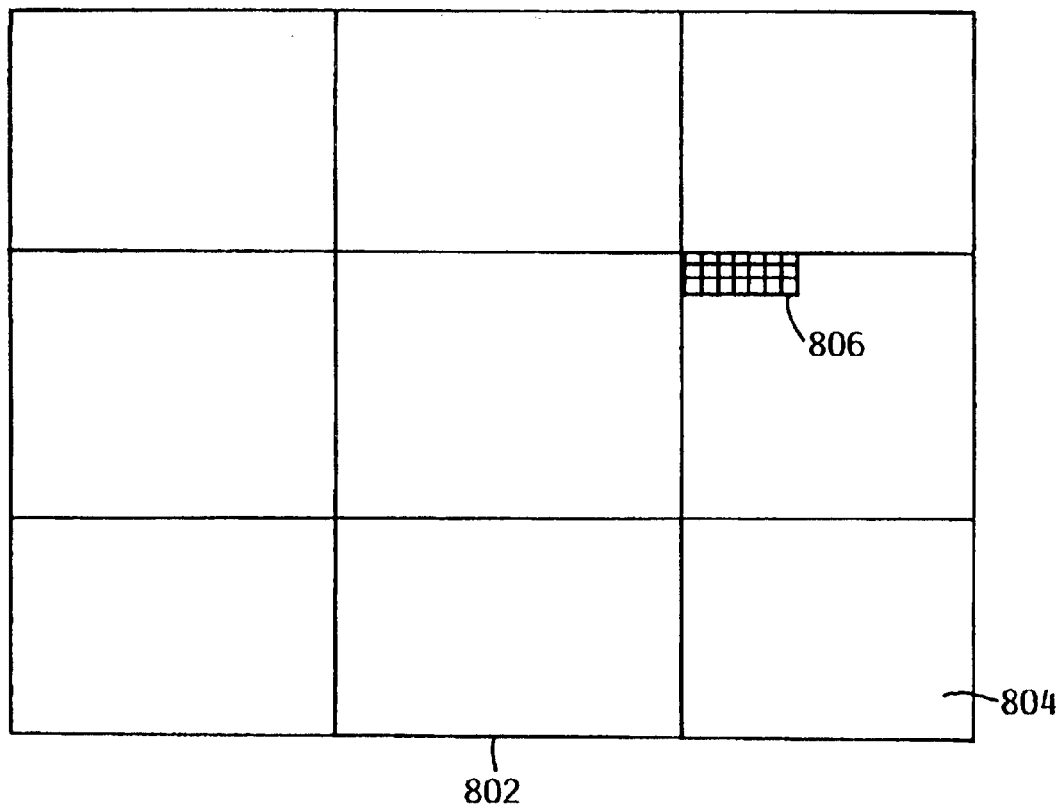
FIG. 8 is a simple illustration of a video frame of a digital data stream divided into sections having pixels used in one embodiment of the invention to identify visual content of the data stream.

FIG. 7 is an example of one embodiment to program the playback of the disk based on content, rather than on predetermined tracks. Each of the regions as determined by the method herein may have the start-up mode 225 and/or may have a separate or additional attribute as set forth in the region field 236, 246, 266, 276, 286, and 296 in FIG. 2. The process steps of FIG. 7 occur to determine the starting boundary as between steps 520 and 532 and the stopping boundary as between steps 522 and 542 of FIG. 5. Starting the method of FIG. 7 at F, step 702, a selected current play position on the disk is set as a temporarily saved starting or stopping address as in step 704. In step 706 a frame 802 of FIG. 8 corresponding to that temporarily saved address is retrieved. For a DVD, a frame would be an image captured by the camera for digital image processing in which there may be, for example, sixty frames per second. At step 708, the frame is divided into a number of sections 804 each comprising a number of pixels 806 as in FIG. 8. Returning to the process of FIG. 7, the red/green/blue (RGB) value for each pixel 806 in the section is computed and then all the RGB values are averaged for the section as is known in the art of digital image processing at step 710 and saved in step 712. The frame is then decremented by one in step 714 and in step 720, it is determined whether the process has backed up the maximum number of frames. The purpose of these steps is to determine when the scene changes to mark the boundaries and depending upon the user's response time, it may be necessary to back the disk several seconds to actually find the frame in which a visual scene changes. If the number of previous frames is less than the maximum then in step 722, the previous frame is retrieved.

The image processing proceeds with sectioning the frame 802 as in step 708 and for each section 804, computing the average of the RGB values of each pixel for that section as in step 710. At step 730, to determine if there is a scene change, the process determines if the difference in the average RGB values of the greatest number of sections is the greatest between the two frames. At steps 532/542, the position of the frame having the maximum number of sections whose average RGB values differs the most from the previous frame becomes the starting or stopping address saved in the regions 232 and 234 of FIG. 2. If the difference in the number of sections having the maximum difference in RGB values is not the greatest, then the process loops back to step 712 to save the average RGB values for that frame, decrements the frame to retrieve the next previous frame and the process repeats itself until the scene change is detected or until the maximum number of frames have been analyzed for average RGB values.

The preferred embodiment of the invention has been described with respect to visual content and detection of scene changes using a difference of average RGB values between consecutive frames and presumes the DVD has both audio and video data. Other embodiments of the invention include the capability of editing audio content by, for instance, detecting rests or pauses or specific frequencies of music. Yet, another embodiment includes detection of libretto or dialog content using voice recognition analyses capable of identifying, e.g., certain high frequencies of a soprano, or profanity, or the sound of war or gunfire or screaming, etc.—whatever content the user finds either objectionable or desirable. Attributes can be assigned to written material using, e.g., word processing software.

While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

What is claimed is:

1. A method to create a playback program for a disk, comprising the steps of:
   (a) selecting a region of said disk based on content, said region independent of tracks defined during the recording of said content onto said disk;
   (b) ascribing at least one playback attribute to said selected region; and
   (c) saving the region and the at least one ascribed playback attribute in a semiconductor memory.

2. The method of claim 1, further comprising:
   (a) selecting another region; and
   (b) ascribing another playback attribute to said another region.

3. The method of claim 2, in which said step of selecting said region further comprises determining a starting boundary and a stopping boundary of each of said regions.

4. The method of claim 3, further comprising modifying the output of said content of said regions between said starting boundary and said stopping boundary according to said playback attribute during playback of said disk.

5. The method of claim 3, further comprising allocating a start-up mode to indicate whether to playback said disk or to skip to a first of said regions at the beginning of said playback program.

6. The method of claim 4, wherein said content comprises video data.

7. The method of claim 5, wherein said start-up mode causes said playback program to advance to the first of said regions and said step of modifying said content further comprises modifying said output of said video data in accordance with said playback attribute of said region.

8. The method of claim 5, wherein said start-up mode causes said playback program to play from the beginning of said disk and said step of modifying the content comprises modifying said output of said video data in said regions in accordance with said playback attribute of said region.

9. The method of claim 5, wherein said content comprises audio data.

10. The method of claim 9, wherein said start-up mode causes said playback program to advance to the first of said regions and said step of modifying the content comprises modifying said output of said audio data in accordance with said playback attribute of said region.

11. The method of claim 9, wherein said start-up mode causes said playback program to play from the beginning of said disk and said step of modifying the content comprises modifying said output of said audio data in said region in accordance with said playback attribute of said region.

12. The method of claim 3, further comprising modifying the output of said content of said regions between said stopping boundary of one region and said starting boundary of another region according to said playback attribute during playback of said disk.

13. The method of claim 3, further comprising assigning a password to access said playback program.

14. A method to create a playback program for a disk, comprising the steps of:
   (a) selecting a plurality of regions of said disk based on content, said regions independent of tracks defined during the recording of said content onto said disk;
   (b) determining a starting boundary and a stopping boundary of each of said regions;
   (c) ascribing one or more playback attributes to each of said selected regions;
   (d) saving the regions and the ascribed playback attributes for each region in a semiconductor memory;
   (e) modifying the output of said content of said regions between said starting boundary and said stopping boundary according to said playback attribute during playback of said disk;
   (f) assigning a password to access said playback program;
   (g) allocating a first start-up mode to advance to the first region;
   (h) allocating a second start-up mode to playback the disk from the beginning of said disk;
   (i) allocating a third start-up mode requiring said password to access said playback program;
   wherein in said first start-up mode, the playback program advances to the first of said regions and modifies said output of said disk in said regions in accordance with said playback attribute of said region;
   and in said second start-up mode, the playback program plays from the beginning of said disk modifies the output of said disk in said regions in accordance with said playback attribute of said region; and
   in a third start-up mode, the disk is played back unmodified from the beginning if said password is verified.

15. The method of claim 14, further comprising:
   (a) detecting when a scene change occurs in the video output of the disk;
   (b) marking the scene change as a boundary of the region.

16. An apparatus to create a playback program to modify the output of a disk, comprising:
   (a) a microprocessor;
   (b) a semiconductor memory connected to the microprocessor;
   (c) a disk identifier to read the disk and assign an identify to the playback program corresponding to the disk;
   (d) a content reader to read the content of said disk;
   (e) a region creator to create regions independent of any manufactured tracks of the disk based on the content of the region;

(f) an attribute assigner to assign an attribute to modify the output of the content of the disk in each region; and (g) a pointer to point to the next region, if any.

17. The apparatus of claim 15, further comprising:
   (a) a password requester requiring a password before playback program can be accessed.

18. The apparatus of claim 15, wherein said apparatus is a personal computer.

19. The apparatus of claim 15, said apparatus is microprocessor-based disk player.

20. A program product for use with a disk player connected to a microprocessor and a semiconductor memory for creating and/or executing a playback program, said program product comprising a signal-bearing medium carrying thereon:
   (a) a program assigner to provide an identification to the playback program corresponding to a particular disk;
   (b) a region creator to create regions based on the content of the region independent of any manufactured tracks of the disk;
   (c) an attribute assigner to assign an attribute to modify the output of the content of the disk in each region; and
   (d) a pointer to point to the next region, if any.

21. An apparatus to create a playback program to modify the output of a disk, comprising:
   (a) means to view and/or listen to the content of the disk;
   (b) means to create/read regions corresponding to the content of the disk independent of prerecorded tracks on the disk; and
   (c) means to assign a modification attribute to modify the output of the disk in the regions.

* * * * *